US012664119B2

(12) United States Patent

Leisenheimer et al.

(10) Patent No.: US 12,664,119 B2

(45) Date of Patent: Jun. 23, 2026

(54) Inter-Integrated Circuit (I²C) Interface With Device Address Used For Device Configuration

(71) Applicant: Infineon Technologies AG, Neubiberg (DE)

(72) Inventors: Stephan Leisenheimer, Oberhaching (DE); Catalina-Petruta Juglan, Bucharest (RO); Richard Heinz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 112 days.

(21) Appl. No.: 18/449,524

(22) Filed: Aug. 14, 2023

(65) Prior Publication Data

US 2025/0004977 A1 Jan. 2, 2025

Related U.S. Application Data

(60) Provisional application No. 63/511,348, filed on Jun. 30, 2023.

(51) Int. Cl.
G06F 13/42 (2006.01)
G06F 13/40 (2006.01)

(52) U.S. Cl.
CPC ...... G06F 13/4282 (2013.01); G06F 13/4022 (2013.01)

(58) Field of Classification Search
CPC .......................... G06F 13/4282; G06F 13/4022
See application file for complete search history.

(56) References Cited

U.S. PATENT DOCUMENTS

| | | | |
|---|---|---|---|
| 9,003,096 B2 * | 4/2015 | Trifonov | G06F 13/4282 |
| | | | 710/110 |
| 10,860,509 B1 | 12/2020 | Watkins et al. | |
| 2006/0282592 A1 | 12/2006 | Zakriti | |

(Continued)

FOREIGN PATENT DOCUMENTS

CN 115309678 A 11/2022

*Primary Examiner* — Henry Tsai
*Assistant Examiner* — Harry Z Wang
(74) *Attorney, Agent, or Firm* — Harrity & Harrity, LLP

(57) ABSTRACT

A device is configured with a plurality of device addresses and a plurality of dedicated device configurations, with each device address being associated with one dedicated device configuration. The device includes an inter-integrated circuit (I²C) communication interface configured to receive a serial data line (SDA) signal that includes an address frame that identifies a target device for communication with a master device and a dedicated device configuration of the target device. The device includes a processing circuit configured to decode the address frame to identify the target device. Based on the device being the target device, the processing circuit is configured to decode the address frame to identify the dedicated device configuration corresponding to one dedicated device configuration of the plurality of dedicated device configurations of the device, and the processing circuit is configured to configure the device according to the dedicated device configuration identified based on the address frame.

20 Claims, 7 Drawing Sheets

100

(56)     References Cited

U.S. PATENT DOCUMENTS

| | | | |
|---|---|---|---|
| 2008/0222431 A1* | 9/2008 | Paniagua | H02J 7/00047 |
| | | | 713/300 |
| 2010/0231262 A1* | 9/2010 | Ito | G11C 8/10 |
| | | | 326/105 |
| 2013/0155279 A1* | 6/2013 | Khan | H04N 25/00 |
| | | | 348/E5.031 |
| 2018/0150424 A1* | 5/2018 | Miluzzi | G06F 13/4282 |
| 2018/0173667 A1* | 6/2018 | Mishra | G06F 13/4282 |
| 2019/0034374 A1* | 1/2019 | Kim | G06F 13/4282 |
| 2019/0236042 A1* | 8/2019 | O'Shea | G06F 13/4291 |
| 2021/0216388 A1* | 7/2021 | Kumar | G06F 11/079 |
| 2022/0308645 A1 | 9/2022 | Colombo et al. | |
| 2022/0308892 A1 | 9/2022 | Colombo et al. | |
| 2024/0184727 A1* | 6/2024 | Shin | G06F 13/362 |

* cited by examiner

Inter-Integrated Circuit (I²C) Interface With Device Address Used For Device Configuration

CROSS-REFERENCE TO RELATED APPLICATION

This Patent Application claims priority to U.S. Provisional Patent Application No. 63/511,348, filed on Jun. 30, 2023, entitled "INTER-INTEGRATED CIRCUIT (I²C) INTERFACE WITH DEVICE ADDRESS USED FOR DEVICE CONFIGURATION," which is hereby expressly incorporated by reference herein.

BACKGROUND

An inter-integrated circuit (I²C) bus is a synchronous, multi-master/multi-slave (controller/target), packet switched, single-ended, serial communication bus. The I²C bus is widely used for attaching lower-speed peripheral integrated circuits (ICs) to processors and microcontrollers in short-distance, intra-board communication. For example, the I²C bus may enable a microcontroller to control a network of device chips with two general-purpose input/output (I/O) pins and software. For example, for conducting communications, I²C devices use two bidirectional open-collector or open-drain lines: serial data (SDA) line and serial clock line (SCL), pulled up with resistors

SUMMARY

In some implementations, an I²C system includes a first device comprising: a first processing circuit; and a first I²C communication interface configured to generate a first SDA signal based on an instruction received from the first processing circuit, wherein the first SDA signal comprises a first address frame that identifies a first target device address of a first target device for communication with the first device and a first dedicated device configuration of the first target device; and a second device configured with a plurality of device addresses and a plurality of dedicated device configurations, wherein each device address of the plurality of device addresses is associated with one dedicated device configuration of the plurality of dedicated device configurations, wherein the second device comprises: a second I²C communication interface configured to receive the first SDA signal; and a second processing circuit configured to decode the first address frame to determine whether the second device corresponds to the first target device address, wherein, based on the second device corresponding to the first target device address, the second processing circuit is configured to decode the first address frame to identify the first dedicated device configuration corresponding to one dedicated device configuration of the plurality of dedicated device configurations indicated by the first address frame, and wherein the second processing circuit is configured to configure the second device according to the first dedicated device configuration identified based on the first address frame.

In some implementations, an I²C device configured with a plurality of device addresses and a plurality of dedicated device configurations includes at least one memory configured to store the plurality of device addresses and the plurality of dedicated device configurations, wherein each device address of the plurality of device addresses is associated with one dedicated device configuration of the plurality of dedicated device configurations; an I²C communication interface configured to receive an SDA signal from a master device, wherein the SDA signal comprises an address frame that identifies a target device address of a target device for communication with the master device and a dedicated device configuration of the target device; and a processing circuit configured to decode the address frame to determine whether one of the plurality of device addresses corresponds to the target device address, wherein the processing circuit is configured to decode the address frame to determine the dedicated device configuration corresponding to one dedicated device configuration of the plurality of dedicated device configurations indicated by the address frame, and wherein, based on one of the plurality of device addresses corresponding to the target device address, the processing circuit is configured to configure the I²C device according to the dedicated device configuration determined from the address frame.

In some implementations, a method configuring an I²C device includes receiving an SDA signal from a master device, wherein the SDA signal comprises an address frame that identifies a target device address of a target device for communication with the master device and a dedicated device configuration of the target device; decoding the address frame to determine whether one of a plurality of device addresses of the I²C device corresponds to the target device address; decoding the address frame to determine which one of a plurality of device addresses of the I²C device corresponds to the dedicated device configuration indicated by the address frame; and based on one of the plurality of device addresses corresponding to the target device address, configuring the I²C device according to the dedicated device configuration identified from the address frame.

BRIEF DESCRIPTION OF THE DRAWINGS

Implementations are described herein with reference to the appended drawings.

DETAILED DESCRIPTION

Figure 1:
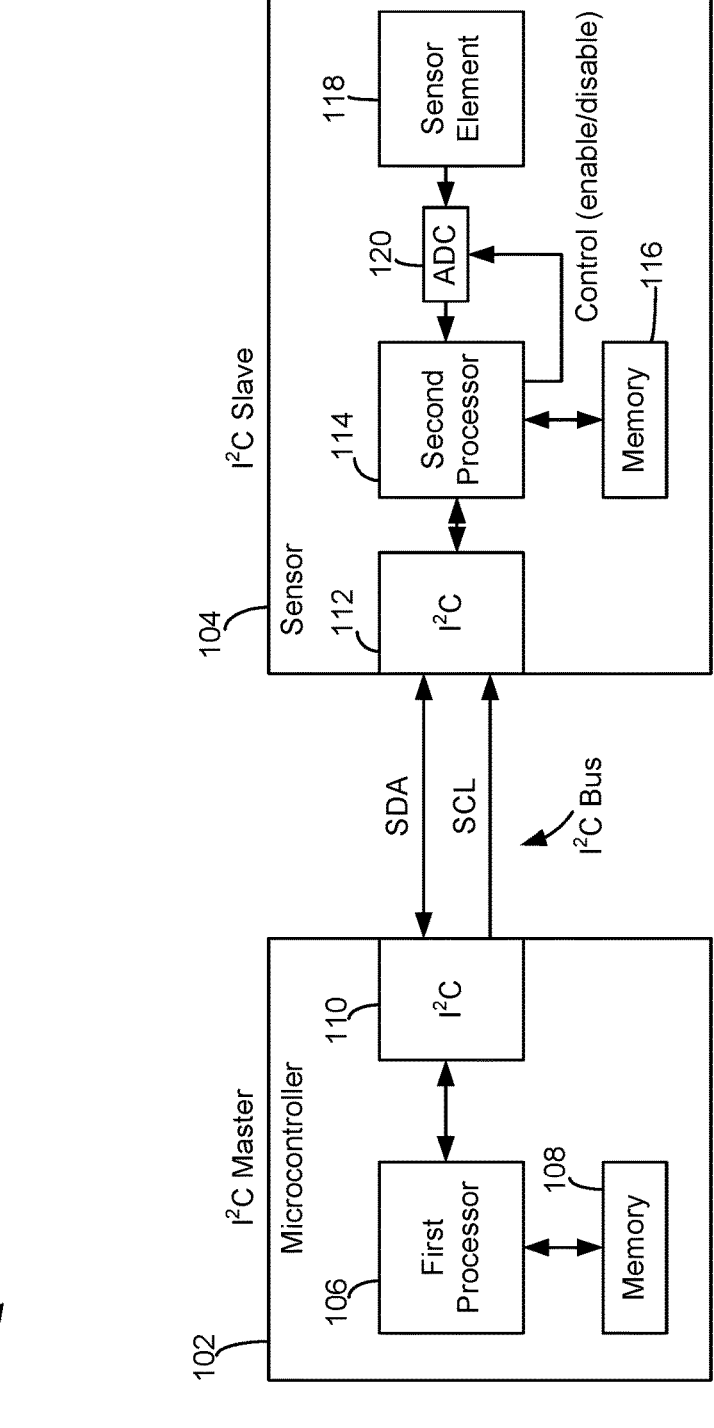
FIG. 1 shows an I²C system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electric sensor signal (e.g., a current signal or a voltage signal). The property to be measured may, for example, comprise a magnetic field, an electric field, an electromagnetic wave (e.g., a radio wave), a pressure, a temperature, a force, a current, or a voltage, but is not limited thereto. A sensor device may communicate with a controller (e.g., a microcontroller) via an I²C bus. Communications may include transmitting a read command, a write command, or data from the controller to the sensor device, or transmitting sensor data from the sensor device to the controller.

An I²C communication protocol uses a clock transmitted on a serial clock line (SCL) and data signal transmitted on a serial data (SDA) line with seven-bit (7-bit) addressing. The controller generates the clock and initiates communication with target devices (slaves). Each target device receives the clock and responds to the controller when addressed by the controller (master). The seven-bit addressing is provided as an address frame and represents a device address to the target device with which the controller would like to communicate with. For example, the controller may be initially in a transmit mode by setting a start condition followed by the seven-bit address of the target device the controller wishes to communicate with, which is followed by a single read/write command bit representing whether the controller wishes to write (0) to or read (1) from the target device. If the target device corresponding to the seven-bit address exists on the I²C bus, the target device will respond with an acknowledgment (ACK) bit. The controller then continues in either a transmit mode or a receive mode (according to the read/write command bit sent), and the target device continues in a complementary mode (receive or transmit, respectively).

The start condition is typically indicated by a high-to-low signal transition of a SDA signal on the SDA line with the SCL high, and the stop condition is typically indicated by a low-to-high signal transition of the SDA signal on the SDA line with the SCL high. All other signal transitions on the SDA line take place with the SCL set low. An I²C transaction may include multiple messages. The controller may terminate a message with the stop condition at the end of the transaction or the controller may send another start condition to retain control of the I²C bus for another message. Thus, the start condition and the stop condition set by the controller may act as message delimiters (e.g., message frame delimiters) and are distinct from address bits, read/write command bit, and data bits. Thus, the start condition and the stop condition may define one communication frame.

The sensor device may be programmed with multiple configurations that may be chosen from for setting a configuration of the sensor device. Usually, an interrupt pin is used in combination with configurable trigger options. For example, the controller and the sensor device may each include a respective interrupt pin, and the respective interrupt pin may be connected by an interrupt signal line. The interrupt pins and the interrupt line are provided in addition to the SCL and the SDA line of the I²C bus. The interrupt pins require an additional pad and an additional bond at each device and a separate wire is needed to connect the controller and the sensor device. In order for the controller to set a configuration of the sensor device, the controller typically transmits an interrupt on the interrupt line. The configurability of the configurable trigger options can be realized via an additional communication byte or a write configuration command sent on the I²C bus or on the interrupt line.

As a result, additional hardware, additional communication effort, and additional current consumption are needed to trigger a configuration to be implemented at the sensor device, resulting in higher costs and a faster depletion of power resources. For example, for sensor devices that operate based on a limited power supply, such as a battery, the additional current consumption for performing the interrupt and configuration trigger may result in shorter durations in operability before the limited power supply can be recharged. In some cases, the limited power supply may not be rechargeable. Thus, in those cases, the additional current consumption may result in a shorter lifetime of the sensor device.

Accordingly, some implementations disclosed herein are directed to an I²C system that encodes configuration information in an address frame of the data signal transmitted on the SDA line (e.g., an SDA signal). Thus, the address frame is used to identify a target device for communication with the controller. In addition, the address frame is used to identify and trigger a dedicated device configuration of the target device. An interrupt is not needed to set a dedicated device configuration of the target device (e.g., a sensor device), which eliminates a need for a interrupt pins and an additional wire used for transmitting an interrupt. Thus, a current consumption of the controller and the target device can be reduced. Moreover, without the need for the interrupt pins and the additional wire, hardware of the controller and the target device can be simplified and can be made smaller, which may reduce manufacturing costs. For example, the controller may be integrated in a semiconductor chip that requires one less pin and less processing power to generate the interrupt. Similarly, the target device may be integrated in another semiconductor chip that requires one less pin and less processing power to process the interrupt. In addition, simplifying a manufacturing of the controller and the target device may reduce $CO_2$ emissions produce during manufacturing. By encoding the configuration information in an address frame of the data signal transmitted on the SDA line, an overall communication efforts can be reduced, which, again, may reduce a total current consumption compared to a total current consumption used when interrupt pins are used to trigger a configuration of the target device.

FIG. 1 shows an I²C system 100 according to one or more implementations. The I²C system 100 includes a first device 102 (e.g., an I²C master, such as a microcontroller) and a second device 104 (e.g., an I²C slave, such as a sensor device).

The first device 102 may include a first processing circuit 106 (e.g., including at least one processor), a memory 108 that stores device addresses of one or more slave devices, and a first I²C communication interface 110 configured to generate a first SDA signal based on an instruction received from the first processing circuit 106 and a clock signal for transmission on an SCL. Each device address stored in the memory 108 may be associated with a respective dedicated device configuration of a slave device. The first SDA signal includes a first address frame that identifies a first target device address of a first target device for communication with the first device 102 and a first dedicated device configuration of the first target device. The first dedicated device configuration encoded in the first address frame may be used to trigger an implementation or a setup of the first dedicated device configuration of the first target device.

The first device 102 may transmit the first address frame during a first communication frame. Additionally, the first device 102 may transmit a subsequent address frame (e.g., a second address frame) with the first SDA signal during a subsequent communication frame (e.g., a second communication frame). The subsequent address frame may identify a second target device for communication with the first device 102 and a second dedicated device configuration of the second target device. The second target device may be the same as the first target device, or the second target device may be different from the first target device. The second dedicated device configuration may be the same as the first dedicated device configuration, or the second dedicated device configuration may be different from the first dedicated device configuration. Thus, for each communication frame, the first device 102 may transmit an address frame that identifies a respective target device and a respective device configuration of the respective target device.

The second device 104 may be configured with a plurality of device addresses and a plurality of dedicated device configurations. In other words, the second device 104 may be enabled for communication with the first device 102 when any one of the second device's 104 addresses is received in an address frame transmitted from the first device 102. In addition, the second device 104 may be configurable according to one or more of the plurality of dedicated device configurations. The second device 104 may be triggered to enable, enact, or otherwise setup one or more of the plurality of dedicated device configurations based on a dedicated device configuration specified in an address frame received from the first device 102. Enabling a dedicated device configuration may include enabling or disabling one or more components of the second device 104, enabling or disabling one or more functions of the second device 104, enabling or disabling one or more processes of the second device 104, and/or enabling or disabling one or more programs or firmware of the second device 104. Additionally, each device address of the plurality of device addresses of the second device 104 may be associated with one dedicated device configuration of the plurality of dedicated device configurations of the second device 104. Thus, each address frame may be used to trigger one dedicated device configuration of the target device (e.g., one dedicated device configuration of the second device 104).

The second device 104 may include a second I²C communication interface 112 configured to receive the first SDA signal (e.g., via an I²C bus) from the first device 102 and a second processing circuit 114 (e.g., including at least one processor) configured to decode the first address frame to identify or otherwise determine whether the second device 104 corresponds to the first target device address. In other words, the second processing circuit 114 may determine whether second device 104 corresponds to the first target device with which the first device 102 would like to communicate with. The second device 104 may further include a memory 116, a sensor element 118 configured to generate a sensor signal based on a measurable property, and a sampling circuit 120 (e.g., at least one analog-to-digital converter (ADC)) configured to sample the sensor signal for generating sensor data.

Based on the second device 104 corresponding to the first target device address, the second processing circuit 114 may be configured to decode the first address frame to identify the first dedicated device configuration corresponding to one dedicated device configuration of the plurality of dedicated device configurations indicated by the first address frame. That is, the second processing circuit 114 may be configured to decode the first address frame to identify which one of its plurality of dedicated device configurations should be implemented. In addition, the second processing circuit 114 may be configured to configure the second device 104 according to the first dedicated device configuration identified based on the first address frame. That is, based on the second processing circuit 114 determining which one of its plurality of dedicated device configurations should be implemented based on the first address frame, the second processing circuit 114 may generate one or more configuration signals (e.g., control signals) in order to set the second device 104 into that dedicated device configuration.

The first device 102 may be further configured to transmit, via the first I²C communication interface 110, the first SDA signal with a second address frame that identifies a second target device address of a second target device for communication with the first device 102 and a second dedicated device configuration of the second target device. The second processing circuit 114 may be configured to decode the second address frame to determine whether the second device 104 corresponds to the second target device address of the second target device indicated in the second address frame. Based on the second device 104 corresponding to the second target device address of the second target device, the second processing circuit 114 may be configured to decode the second address frame to identify the second dedicated device configuration corresponding to one dedicated device configuration of the plurality of dedicated device configurations indicated by the second address frame. That is, the second processing circuit 114 may be configured to decode the first address frame to identify which one of its plurality of dedicated device configurations should be implemented. In addition, the second processing circuit 114 may be configured to configure the second device 104 according to the second dedicated device configuration identified based on the second address frame. That is, based on the second processing circuit 114 determining which one of its plurality of dedicated device configurations should be implemented based on the second address frame, the second processing circuit 114 may generate one or more configuration signals (e.g., control signals) in order to set the second device 104 into that dedicated device configuration.

The second address frame may be transmitted by the first device 102 on the SDA line after the first address frame. The first dedicated device configuration and the second dedicated device configuration may be the same dedicated device configuration or different dedicated device configurations. In some implementations, the first dedicated device configuration may be a sensor trigger-on configuration and the second dedicated device configuration may be sensor trigger-off configuration. In some implementations, the first dedicated device configuration and the second dedicated device configuration may both be a sensor trigger-on/off configuration.

Additional dedicated device configurations may include configuring a read order of a register map of a target device, and a cyclic redundancy check (CRC) configuration. The CRC configuration may indicate a write data length for a CRC calculation.

The address bits of an address frame may be used according to various implementations. For example, all seven bits of the address frame may be used for an address lookup. Once a slave device determines that it is the target device (e.g., based on a device address the slave device corresponding to the target device address), the slave device may use some or all of the seven bits for a configuration lookup. In some implementations, the address lookup and the configuration lookup may performed in a same processing step or action.

Alternatively, the address frame may include a first plurality of bits and a second plurality of bits. The first plurality of bits (e.g., the first three bits) may be address bits that correspond to one of the plurality of addresses of a target device that are used by the slave device determine whether the slave device corresponds to target device address of the target device. Thus, when three bits are used as address bits, up to eight slave devices may be connected to the I²C bus and may be addressable by the first plurality of bits. The second plurality of bits (e.g., the next four bits) may be configuration bits that indicate a dedicated device configurations to be implemented. Thus, the configuration bits may correspond to one of the dedicated device configurations of a target device and may be used by the slave device to identify the (commanded) dedicated device configuration of target device. Thus, when four bits are used as configuration bits, each slave device may have up to sixteen addressable configurations.

Based on receiving the sensor trigger-on configuration, the second processing circuit 114 may be configured to enable the sampling circuit 120 (e.g., one or more ADCs) in order to enable samples to be obtained from the sensor signal of the sensor element 118. Based on receiving the sensor trigger-off configuration, the second processing circuit 114 may be configured to disable the sampling circuit 120 in order to disable obtaining samples of the sensor signal. Based on receiving the sensor trigger-on/off configuration, the second processing circuit 114 may be configured to enable the sampling circuit 120 for one measurement frame and disable the sampling circuit 120 at the end of the measurement frame. For example, the second processing circuit 114 may be configured to automatically disable the sampling circuit 120 in response to the measurement frame being completed without any further instruction received from the first device 102. Thus, the sensor trigger-on/off configuration may be used to trigger one measurement frame. In some implementations, the sensor trigger-on/off configuration may be used to trigger multiple measurement frames (e.g., a defined number of measurement frames) and the second processing circuit 114 may be configured to automatically disable the sampling circuit 120 in response to the multiple measurement frames being completed without any further instruction received from the first device 102.

In some implementations, the sensor trigger-on/off configuration may configure the second device 104 to transmit the sensor data corresponding to the measurement frame to the first device 102 the next time a read command bit is received from the first device 102. The second I²C communication interface 112 may be configured to transmit the sensor data triggered by the first address frame in a second SDA signal transmitted by the second device 104 on the SDA line. For example, the second I²C communication interface 112 may be configured to automatically disable the sampling circuit 120 and transmit the sensor data in response to the measurement frame (or multiple measurement frames) being completed without any further dedicated device configuration being received from the first device 102.

In some implementations, the sensor trigger-on/off configuration may configure the second device 104 to automatically transmit the sensor data corresponding to the measurement frame to the first device 102 during the next communication frame addressed to the second device 104, without any further instruction being received from the first device 102.

The second processing circuit 114 may also be configured to read or otherwise decode the read/write command bit that follows an address frame and perform a read or write function associated with a dedicated device configuration specified in the address frame. For example, a read command indicated by the read/write command bit may trigger the second processing circuit 114 to transmit the sensor data obtained during a specific measurement frame or obtained during a time interval between receiving the first address frame and the second address frame.

In some implementations, the memory 116 of the second device 104 may be configured to store a look-up table that links each device address of the plurality of device addresses of the second device 104 to one dedicated device configuration of the plurality of dedicated device configurations of the second device 104. Each device address of the plurality of device addresses of the second device 104 may be linked to a different dedicated device configuration of the plurality of dedicated device configurations.

In some implementations, the memory 116 of the second device 104 may be configured to store the plurality of device addresses of the second device 104. The second processing circuit 114 may be configured to refer to the plurality of device addresses stored in the memory 116 and determine whether the second device 104 corresponds to the first target device address of the first target device based on whether the first address frame corresponds to one of the device addresses of the plurality of device addresses stored in the memory 116 of the second device 104. Based on the first address frame corresponding to one of the device addresses of the plurality of device addresses stored in the memory 116, the second processing circuit 114 may be configured to refer to a mapping that associates each device address of the plurality of device addresses stored in memory 116 of the second device 104 with one dedicated device configuration of the plurality of dedicated device configurations for identifying the first dedicated device configuration that is to be configured by the second processing circuit 114.

In some implementations, the second processing circuit 114 may be configured to decode the seven bits of the seven-bit address frame to determine the first target device address of the first target device (e.g., to determine whether the second device 104 corresponds to the first target device address). In addition, based on the second device 104 corresponding to the first target device address, the second processing circuit 114 may be configured to decode the seven bits to identify the first dedicated device configuration specified in the seven-bit address frame. Thus, an address of the first target device and the first dedicated device configuration of the first target device may both be encoded in the seven bits. The first SDA signal includes a command bit (e.g., read command bit or a write command bit) that follows the first address frame.

In some implementations, the first address frame may include a first plurality of bits and a second plurality of bits. The first plurality of bits may be address bits that identify the first target device. The second plurality of bits may be configuration bits corresponding to the first dedicated device configuration of the first target device. The second processing circuit 114 may be configured to decode the first plurality of bits to identify the first target device (e.g., to determine whether the second device 104 corresponds to the first target device address). Based on the second device 104 corresponding to the first target device address, the second processing circuit 114 may be configured to decode the second plurality of bits to identify the first dedicated device configuration.

As indicated above, FIG. 1 is provided as an example. Other examples may differ from what is described with regard to FIG. 1. The number and arrangement of components shown in FIG. 1 are provided as an example. In practice, the I²C system 100 may include additional components, fewer components, different components, or differently arranged components than those shown in FIG. 1. Two or more components shown in FIG. 1 may be implemented within a single component, or a single component shown in FIG. 1 may be implemented as multiple, distributed components.

Figure 2:
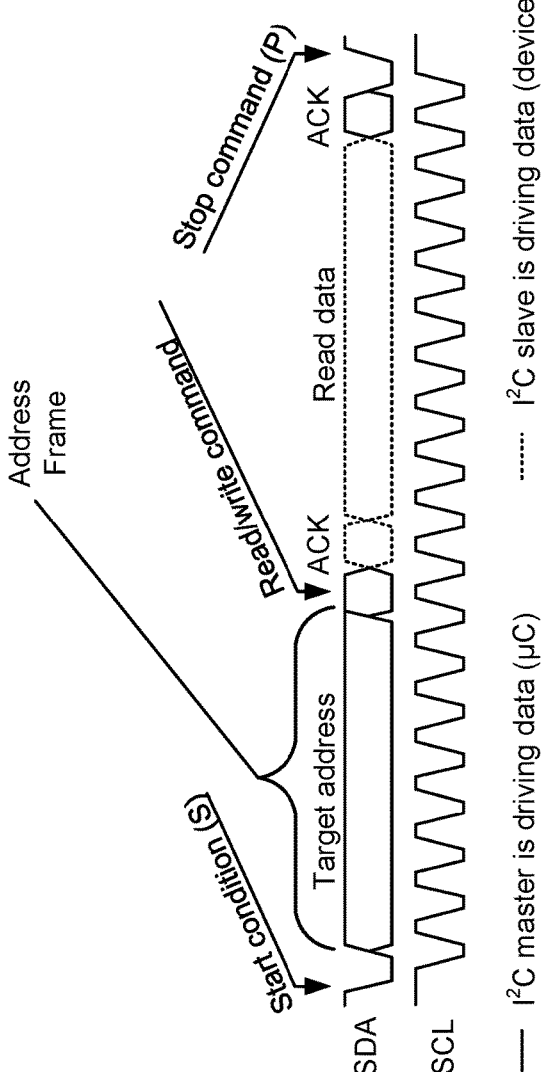
FIG. 2 shows a signal diagram of SDA signals and a clock signal according to one or more implementations.

FIG. 2 shows a signal diagram 200 of SDA signals and a clock signal according to one or more implementations. The SDA signals are transmitted in parallel to the clock signal transmitted on the SCL. The signal diagram 200 may correspond to a single communication frame delimited by a start condition(S) and a stop condition (P). The start condition(S) and the stop condition (P) are set by the I²C master device (e.g., the first device 102) and may act as message delimiters that are distinct from address bits, read/write command bits, data bits, and ACK bits. A first SDA signal on the SDA line may be driven by an I²C master device and a second SDA signal on the SDA line may be driven by a I²C slave device based on the first SDA signal. Additional SDA signals may be transmitted by the I²C master device and the I²C slave. In addition, the I²C master device may be connected to two or more I²C slaves by the I²C bus.

An address frame, located between the start condition and the read/write command is a seven-bit address that identifies a device address of a target device for communication with the first device 102 and a dedicated device configuration of the target device. The target device may be configured with or otherwise associated with a plurality of device addresses and may have a plurality of dedicated device configurations. The target device may select which one of the plurality of dedicated device configurations to enable based on the dedicated device configuration indicated in the address frame received from an I²C master device (e.g., from the first device 102).

The signals shown in FIG. 2 are provided as an example.

Figure 3:
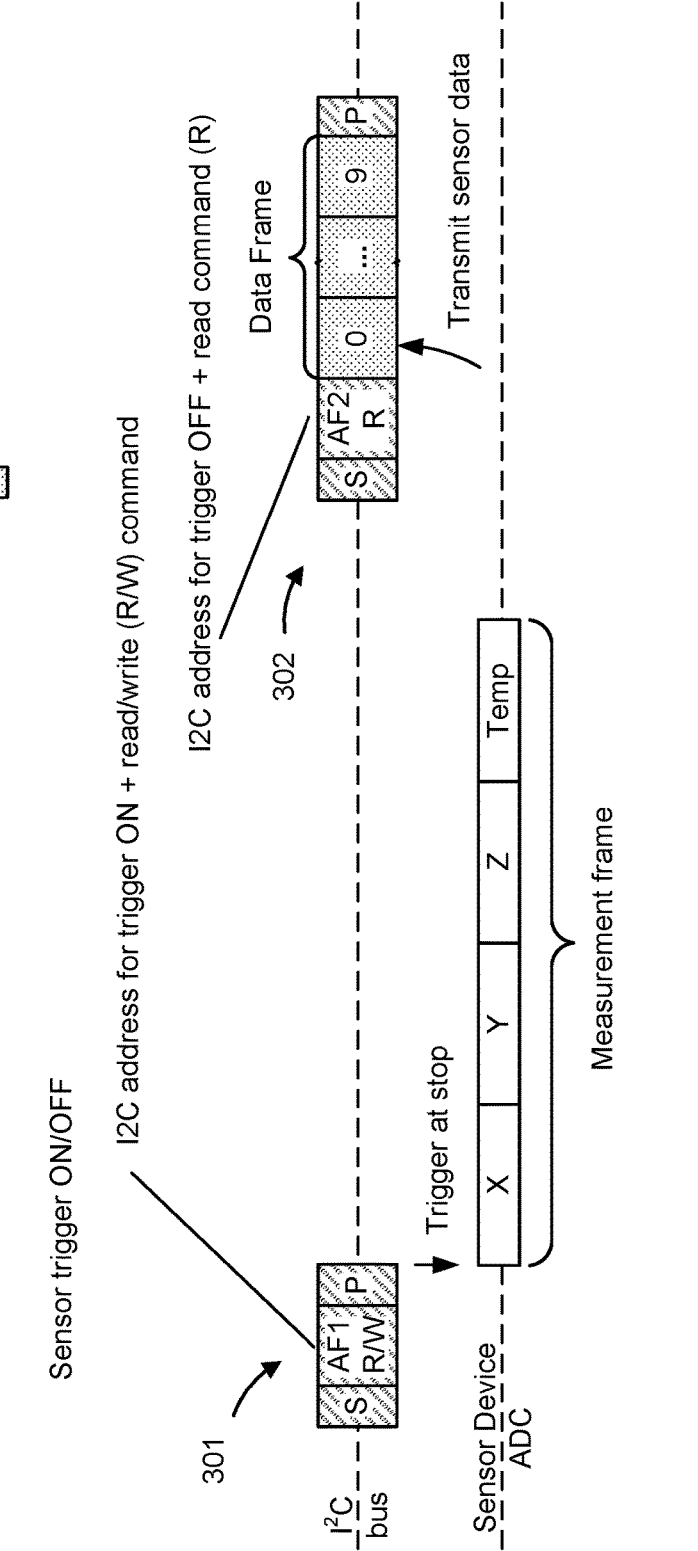
FIG. 3 shows a communication exchange using SDA signals according to one or more implementations.

FIG. 3 shows a communication exchange 300 using SDA signals according to one or more implementations. The communication exchange 300 may take place on a I²C bus between an I²C master device (e.g., the first device 102) and a I²C sensor device (e.g., the second device 104).

The I²C master device may transmit a first message 301 delimited by a start condition(S) and a stop condition (P). The first message 301 may include a first address frame AF1 and a first read/write (R/W) command bit. The first address frame AF1 may include a first I²C address for a target device and may indicate a sensor trigger-on configuration that triggers the target device to configure itself according to the sensor trigger-on configuration. Having confirmed itself as being the target device indicated in the first address frame AF1, the I²C sensor device may implement the sensor trigger-on configuration based on detecting the stop condition (P). In this case, the I²C sensor device may start a measurement of a sensor signal for generating sensor data. For example, a sampling circuit 120 (e.g., an ADC) of the I²C sensor device may obtain samples x, y, and z during a measurement frame and a processing circuit (e.g., the second processing circuit 114) of the I²C sensor device may generate sensor data (temp) based on the samples x, y, and z.

The I²C master device may transmit a second message 302 delimited by a start condition (S) and a stop condition (P). The second message 302 may include a second address frame AF2 and a second read/write (R/W) command bit. The second address frame AF2 may include a second I²C address for a target device and may indicate a sensor trigger-off configuration that triggers the target device to configure itself according to the sensor trigger-off configuration.

Having confirmed itself as being the target device indicated in the second address frame AF2, the I²C sensor device may implement the sensor trigger-off configuration based on decoding the second address frame AF2. In this case, the I²C sensor device may stop a measurement of the sensor signal. For example, the processing circuit of the I²C sensor device may disable the sampling circuit (e.g., the sampling circuit 120) of the I²C sensor device to save power. Additionally, the read/write (R/W) command bit of the second message 302 may be set as a read command (R), which instructs the I²C sensor device to transmit the sensor data generated during the measurement frame. As a result, based on the read command (R), the I²C sensor device may transmit the sensor data to the I²C master device in a data frame during of an active communication frame (e.g., during a communication frame in which the read command (R) was received).

Thus, one measurement of sensor data (e.g., one measurement frame) can be performed on demand.

The communication exchange 300 shown in FIG. 3 is provided as an example. Other device configurations are possible.

Figure 4:
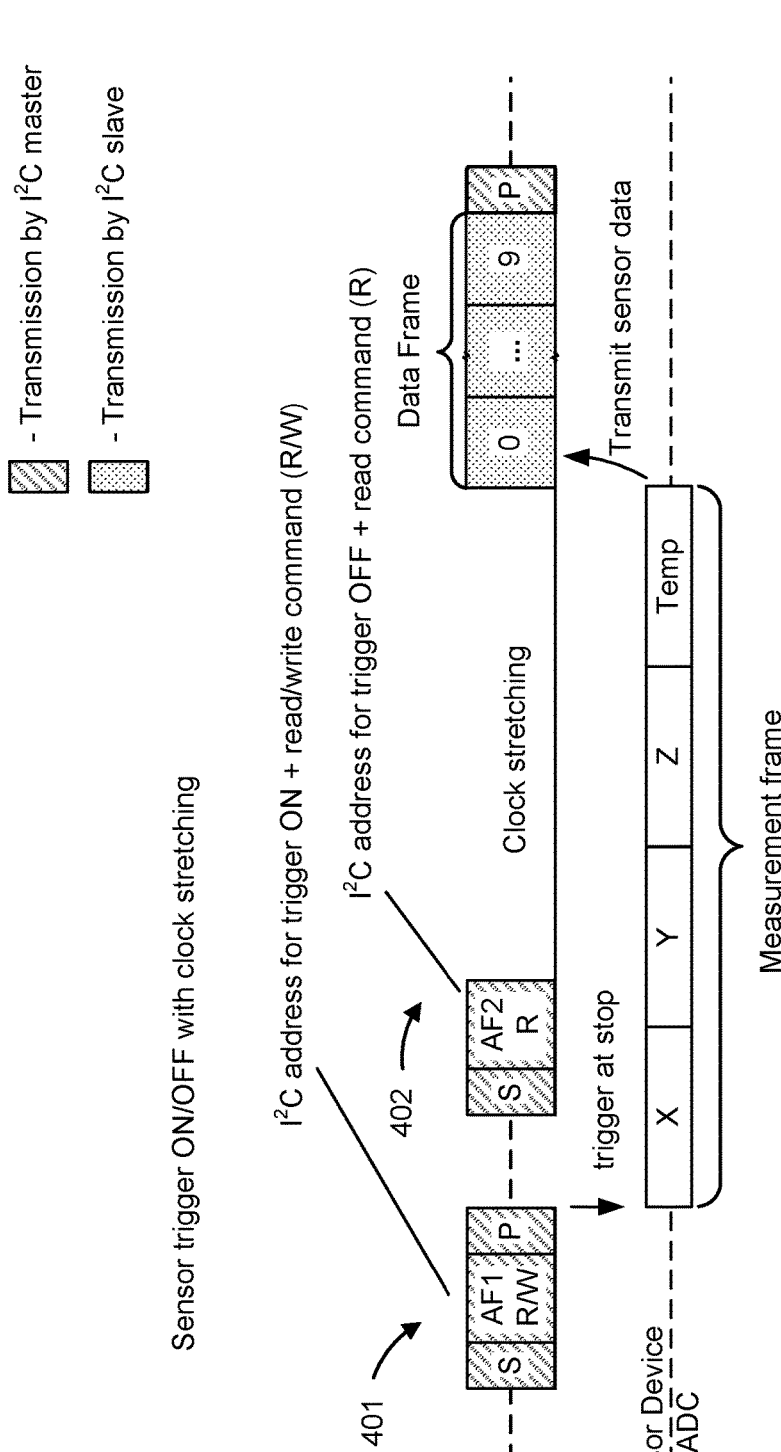
FIG. 4 shows a communication exchange using SDA signals according to one or more implementations.

FIG. 4 shows a communication exchange 400 using SDA signals according to one or more implementations. The communication exchange 400 may take place on a I²C bus between an I²C master device (e.g., the first device 102) and a I²C sensor device (e.g., the second device 104).

The I²C master device may transmit a first message 401 delimited by a start condition (S) and a stop condition (P). The first message 401 may include a first address frame AF1 and a first read/write (R/W) command bit. The first address frame AF1 may include a first I²C address for a target device and may indicate a sensor trigger-on configuration that triggers the target device to configure itself according to the sensor trigger-on configuration. Having confirmed itself as being the target device indicated in the first address frame AF1, the I²C sensor device may implement the sensor trigger-on configuration based on detecting the stop condition (P). In this case, the I²C sensor device may start a measurement of a sensor signal for generating sensor data. For example, a sampling circuit (e.g., the sampling circuit 120) of the I²C sensor device may obtain samples x, y, and z during a measurement frame and a processing circuit (e.g., the second processing circuit 114) of the I²C sensor device may generate sensor data (temp) based on the samples x, y, and z.

Having confirmed itself as being the target device indicated in the first address frame AF1, During the measurement frame, the I²C master device may transmit a second message 402 delimited by a start condition (S) and a stop condition (P). In other words, the I²C master device may transmit the second message 402 while the measurement frame is active (e.g., during an active measurement frame), during which the sensor data is being generated by the I²C sensor device. The second message 402 may include a second address frame AF2 and a second read/write (R/W) command bit transmitted during the measurement frame. The second address frame AF2 may include a second I²C address for a target device and may indicate a sensor trigger-off configuration that triggers the target device to configure itself according to the sensor trigger-off configuration. Additionally, the read/write (R/W) command bit of the second message may be set as a read command (R), which instructs the target device to transmit the sensor data.

Having confirmed itself as being the target device indicated in the second address frame AF2, the I²C sensor device may implement the sensor trigger-off configuration based on decoding the second address frame AF2. However, the I²C sensor device may delay initiating the sensor trigger-off configuration until the active measurement frame is complete. In this case, the I²C sensor device may stop a measurement of the sensor signal. For example, processing circuit of the I²C sensor device may disable the sampling circuit (e.g., the sampling circuit 120) of the I²C sensor device may be disabled to save power. In addition, since a read command (R) has been received in the second message 402 during the measurement frame, the I²C sensor device may be configured to transmit the sensor data obtained during the measurement frame in a second SDA signal as soon as the sensor data is ready for transmission (e.g., as soon as the measurement frame is completed). An interval of the communication frame may be stretched by clock stretching to allow the I²C sensor device to transmit the sensor data in the same communication frame in which the second message 402 was received. As a result, the I²C sensor device may transmit the sensor data to the I²C master device in a data frame during of an active communication frame (e.g., during a communication frame in which the read command (R) was received).

The communication exchange 400 shown in FIG. 4 is provided as an example. Other device configurations are possible.

Figure 5:
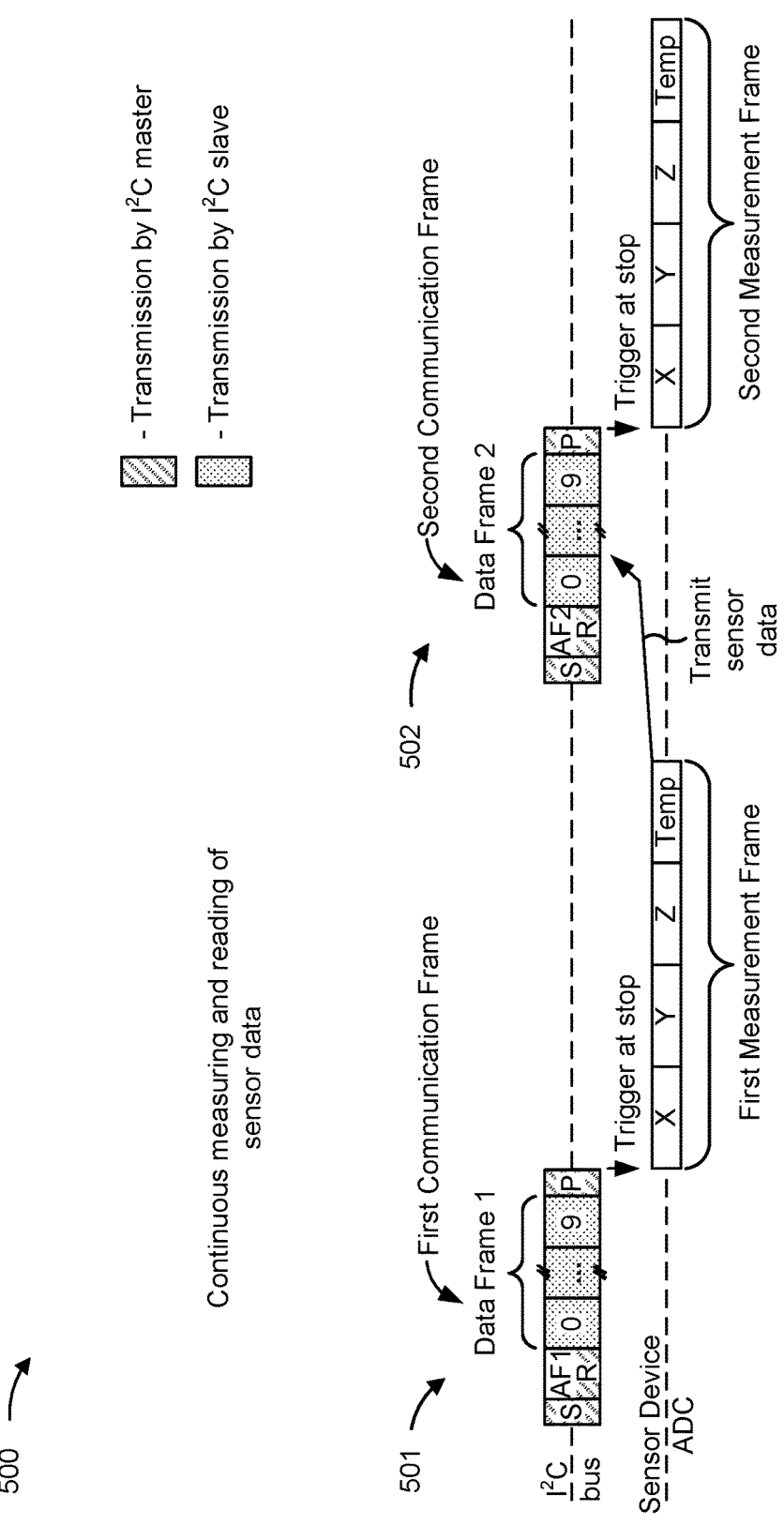
FIG. 5 shows a communication exchange using SDA signals according to one or more implementations.

FIG. 5 shows a communication exchange 500 using SDA signals according to one or more implementations. The communication exchange 400 may take place on a I²C bus between an I²C master device (e.g., the first device 102) and a I²C sensor device (e.g., the second device 104) over multiple communication frames and multiple measurement frames.

The I²C master device may transmit a first message 501 delimited by a start condition (S) and a stop condition (P) and a second message 502 delimited by a start condition (S) and a stop condition (P).

For example, each message 501 and 502 transmitted by the I²C master device may indicate a sensor trigger-on configuration or a sensor trigger-on/off configuration encoded in an I²C address of an address frame and may include a read command bit (R). Thus, the I²C sensor device may be configured to obtain a measurement of sensor data in response to each message 501 and 502 (e.g., in accordance with the sensor trigger-on configuration) and transmit the sensor data, trigged in a previous communication frame, in a next communication frame (e.g., in accordance with the read command bit (R) of the next communication frame). For example, the I²C sensor device may obtain sensor data in a first measurement frame based on the sensor trigger-on configuration received in the first message 501, and the I²C sensor device may transmit the sensor data obtained in the first measurement frame during the second communication frame (e.g., the next communication frame) based on the read command bit (R) received in the second message 502. Meanwhile, the second message 502 may trigger a second measurement frame, during which the I²C sensor device may obtain sensor data based on the sensor trigger-on configuration received in the second message 502. The sensor data obtained in the second measurement frame may be transmitted in response to receiving a read command bit (R) in a subsequent communication frame from the I²C master device (e.g., in a third message—not explicitly illustrated).

The first message 501 and the second message 502 may be spaced apart in time sufficient enough to allow enough time for a measurement of the sensor data to be completed. In other words, a time interval between the first message 501 and the second message 502 may be at least equal to or greater than a measurement frame. Thus, sampling and reading out of sensor data may be continuously triggered over multiple communication frames based on configuration instructions received in the address frames.

The communication exchange 500 shown in FIG. 5 is provided as an example. Other device configurations are possible.

Figure 6:
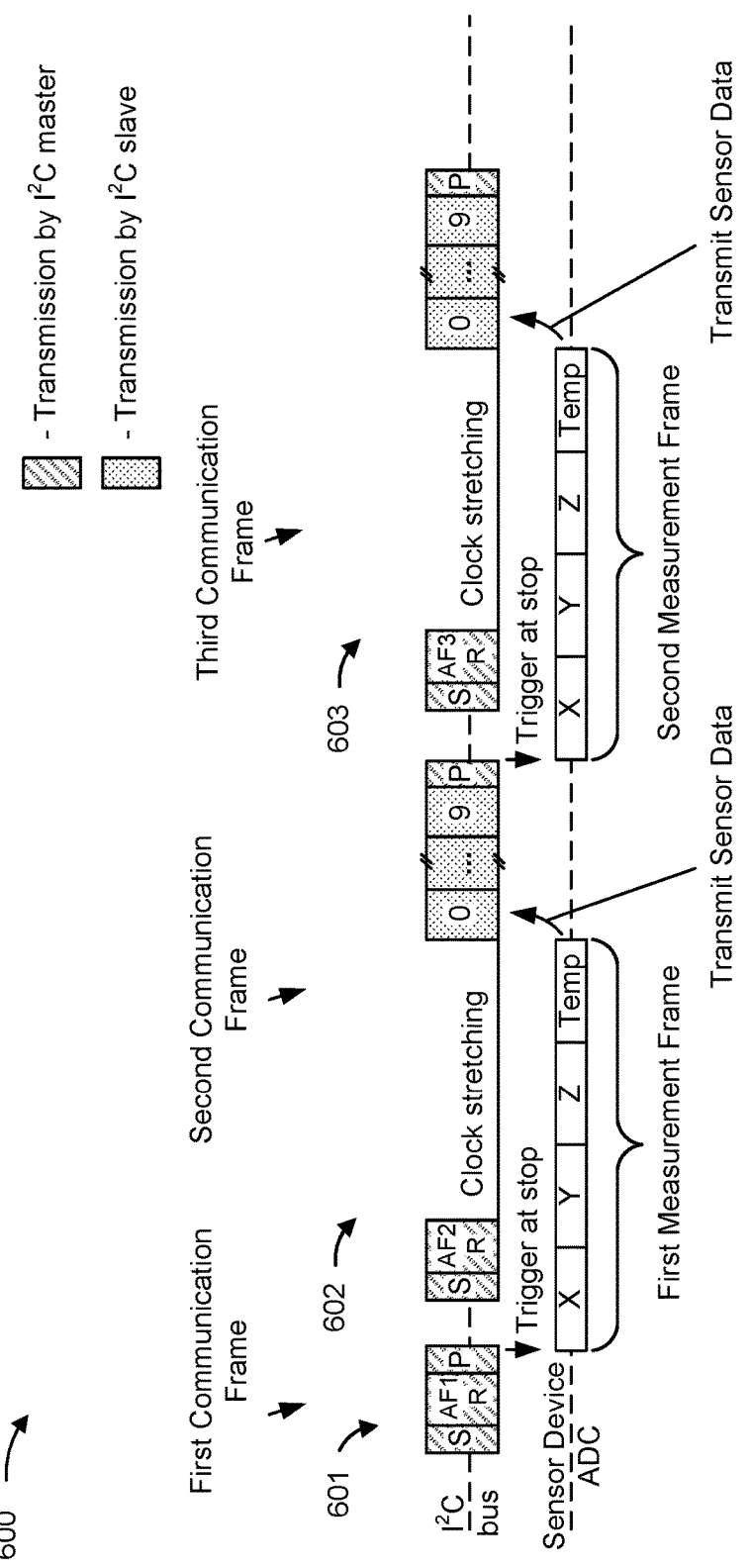
FIG. 6 shows a communication exchange using SDA signals according to one or more implementations.

FIG. 6 shows a communication exchange 600 using SDA signals according to one or more implementations. For example, the communication exchange 600 may be an extension of the communication exchange 400 over multiple communication frames and multiple measurement frames. In this example, a first communication frame, a second communication frame, and a third communication frame are shown. The I²C master device may transmit a first message 601 during the first communication frame. The first message 601 may include a first address frame AF1 and a read/write command bit (R/W). The first address frame AF1 may trigger a first measurement frame to start at a stop condition (P) of the first communication frame. The I²C master device may transmit a second message 602 during the second communication frame and during the first measurement frame. The second message 602 may include a second address frame AF2 and a read command bit (R). The second address frame AF2 may trigger a second measurement frame to start at a stop condition (P) of the second communication frame, and the read command bit (R) may trigger the I²C slave device to transmit the sensor data obtained during the first measurement frame during a data frame of the second communication frame.

The I²C master device may transmit a third message 603 during the third communication frame and during the second measurement frame. The third message 603 may include a third address frame AF3 and a read command bit (R). The third address frame AF3 may trigger a third measurement frame to start at a stop condition (P) of the third communication frame, and the read command bit (R) may trigger the I²C slave device to transmit the sensor data obtained during the second measurement frame during a data frame of the third communication frame Thus, the I²C slave device may be configured to sense and read out sensor data as quickly as possible without a need for an interrupt pin. Furthermore, clock stretching may ensure short measurement intervals with immediate data read out.

The communication exchange 600 shown in FIG. 6 is provided as an example. Other device configurations are possible.

Figure 7:
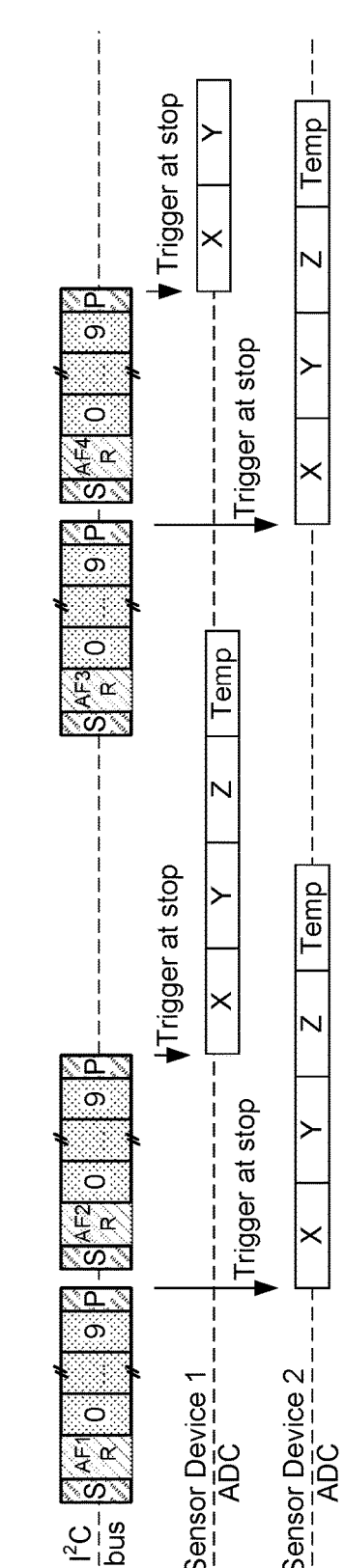
FIG. 7 shows a communication exchange using SDA signals according to one or more implementations.

FIG. 7 shows a communication exchange 700 using SDA signals according to one or more implementations. For example, the communication exchange 700 may include multiple I²C slave devices (e.g., multiple sensor devices), with each I²C slave device having a respective plurality of device addresses and a respective plurality of dedicated device configurations.

The communication exchange 700 shown in FIG. 7 is provided as an example. Other device configurations are possible.

The following provides an overview of some Aspects of the present disclosure:

Aspect 1: An inter-integrated circuit (I²C) system, comprising: a first device comprising: a first processing circuit; and a first I²C communication interface configured to generate a first serial data line (SDA) signal based on an instruction received from the first processing circuit, wherein the first SDA signal comprises a first address frame that identifies a first target device address of a first target device for communication with the first device and a first dedicated device configuration of the first target device; and a second device configured with a plurality of device addresses and a plurality of dedicated device configurations, wherein each device address of the plurality of device addresses is associated with one dedicated device configuration of the plurality of dedicated device configurations, wherein the second device comprises: a second I²C communication interface configured to receive the first SDA signal; and a second processing circuit configured to decode the first address frame to determine whether the second device corresponds to the first target device address, wherein, based on the second device corresponding to the first target device address, the second processing circuit is configured to decode the first address frame to identify the first dedicated device configuration corresponding to one dedicated device configuration of the plurality of dedicated device configurations indicated by the first address frame, and wherein the second processing circuit is configured to configure the second device according to the first dedicated device configuration identified based on the first address frame.

Aspect 2: The I²C system of Aspect 1, wherein the second device further comprises: a memory configured to store a look-up table that links each device address of the plurality of device addresses to one dedicated device configuration of the plurality of dedicated device configurations.

Aspect 3: The I²C system of Aspect 2, wherein each device address of the plurality of device addresses is linked to a different dedicated device configuration of the plurality of dedicated device configurations.

Aspect 4: The I²C system of any of Aspects 1-3, wherein the second device further comprises: a memory configured to store the plurality of device addresses of the second device, wherein the second processing circuit is configured to refer to the plurality of device addresses stored in the memory and determine whether the second device is the first target device based on whether the first target device address corresponds to one of the device addresses of the plurality of device addresses stored in the memory, and wherein, based on the first address frame corresponding to one of the device addresses of the plurality of device addresses stored in the memory, the second processing circuit is configured to refer to a mapping that associates each device address of the plurality of device addresses stored in the memory with one dedicated device configuration of the plurality of dedicated device configurations for identifying the first dedicated device configuration.

Aspect 5: The I²C system of any of Aspects 1-4, wherein the first address frame is a seven-bit address frame comprising seven bits.

Aspect 6: The I²C system of Aspect 5, wherein the second processing circuit is configured to decode the seven bits to determine the first target device address, wherein, based on the second device corresponding to the first target device address, the second processing circuit is configured to decode the seven bits to identify the first dedicated device configuration.

Aspect 7: The I²C system of Aspect 5, wherein the first SDA signal includes a command bit that follows the first address frame, wherein the command bit is a read command bit or a write command bit.

Aspect 8: The I²C system of Aspect 5, wherein the first target device address and the first dedicated device configuration of the first target device are encoded in the seven bits.

Aspect 9: The I²C system of any of Aspects 1-8, wherein the first address frame comprises a first plurality of bits and a second plurality of bits, wherein the first plurality of bits are address bits that identify the first target device address, and wherein the second plurality of bits are configuration bits corresponding to the first dedicated device configuration of the first target device.

Aspect 10: The I²C system of Aspect 9, wherein the second processing circuit is configured to decode the first plurality of bits to determine the first target device address, wherein, based on the second device being the first target device, the second processing circuit is configured to decode the second plurality of bits to identify the first dedicated device configuration.

Aspect 11: The I²C system of any of Aspects 1-10, wherein the first device is a controller, wherein the second device is a sensor comprising a sensor element configured to generate a sensor signal based on a measurable property, wherein the plurality of dedicated device configurations include a sensor trigger-on configuration and a sensor trigger-off configuration, wherein, based on the first dedicated device configuration determined from the first address frame being the sensor trigger-on configuration, the second processing circuit is configured to start a measurement of the sensor signal to generate sensor data, and wherein, based on the first dedicated device configuration determined from the first address frame being the sensor trigger-off configuration, the second processing circuit is configured to stop the measurement of the sensor signal.

Aspect 12: The I²C system of Aspect 11, wherein the second device includes an analog-to-digital converter (ADC) configured to sample the sensor signal to generate the sensor data, and wherein the second processing circuit is configured to enable the ADC to start the measurement of the sensor signal to generate the sensor data and the second processing circuit is configured to disable the ADC to stop the measurement of the sensor signal.

Aspect 13: The I²C system of any of Aspects 1-12, wherein the first device is a controller, wherein the second device is a sensor comprising a sensor element configured to generate a sensor signal based on a measurable property, wherein the plurality of dedicated device configurations include a sensor trigger-on configuration and a sensor trigger-off configuration, wherein, based on the first dedicated device configuration determined from the first address frame being the sensor trigger-on configuration, the second processing circuit is configured to start a measurement frame, during which the sensor signal is sampled by a sampling circuit of the second device, and wherein, based on the first address frame being received during the measurement frame and based on the first dedicated device configuration determined from the first address frame being the sensor trigger-off configuration, the second processing circuit is configured to generate sensor data at an end of the measurement frame and transmit the sensor data to the first device via a second SDA signal.

Aspect 14: The I²C system of any of Aspects 1-13, wherein the first SDA signal comprises a second address frame that identifies a second target device address of a second target device for communication with the first device and a second dedicated device configuration of the second target device, wherein the second processing circuit is configured to decode the second address frame to determine whether the second device corresponds to the second target device address, wherein, based on the second device corresponding to the second target device address, the second processing circuit is configured to decode the second address frame to identify the second dedicated device configuration corresponding to one dedicated device configuration of the plurality of dedicated device configurations indicated by the second address frame, and wherein the second processing circuit is configured to configure the second device according to the second dedicated device configuration identified based on the second address frame.

Aspect 15: The I²C system of Aspect 14, wherein the first device is a controller, wherein the second device is a sensor comprising a sensor element configured to generate a sensor signal based on a measurable property, wherein the plurality of dedicated device configurations include a sensor trigger-on configuration and a sensor trigger-off configuration, wherein the first dedicated device configuration corresponds to the sensor trigger-on configuration, wherein the second dedicated device configuration corresponds to the sensor trigger-off configuration, wherein, based on identifying the first dedicated device configuration from the first address frame, the second processing circuit is configured to start a measurement frame, during which the sensor signal is sampled by a sampling circuit of the second device for generating sensor data, and wherein, based on identifying the second dedicated device configuration from the second address frame, the second processing circuit is configured to stop the sampling circuit from sampling the sensor signal and transmit the sensor data to the first device via a second SDA signal.

Aspect 16: The I²C system of Aspect 15, wherein, if the second address frame is received by the second I²C communication interface during the measurement frame, the second processing circuit is configured to stop the sampling circuit from sampling the sensor signal at a completion time of the measurement frame, generate the sensor data based on the measurement frame being completed, and transmit the sensor data to the first device via the second SDA signal.

Aspect 17: The I²C system of any of Aspects 1-16, wherein the first device is a controller, wherein the second device is a sensor comprising a sensor element configured to generate a sensor signal based on a measurable property, wherein the plurality of dedicated device configurations include a sensor trigger-on/off configuration, wherein, based on the first dedicated device configuration determined from the first address frame being the sensor trigger-on/off configuration, the second processing circuit is configured to start a measurement frame, during which the sensor signal is sampled by a sampling circuit of the second device for generating sensor data, automatically stop the sampling circuit from sampling the sensor signal at an end of the measurement frame, and automatically generate the sensor data based on samples of the sensor signal obtained during the measurement frame.

Aspect 18: The I²C system of Aspect 17, wherein the first SDA signal includes a stop signal that triggers the start of the measurement frame.

Aspect 19: An inter-integrated circuit (I²C) device configured with a plurality of device addresses and a plurality of dedicated device configurations, comprising: at least one memory configured to store the plurality of device addresses and the plurality of dedicated device configurations, wherein each device address of the plurality of device addresses is associated with one dedicated device configuration of the plurality of dedicated device configurations; an I²C communication interface configured to receive a serial data line (SDA) signal from a master device, wherein the SDA signal comprises an address frame that identifies a target device address of a target device for communication with the master device and a dedicated device configuration of the target device; and a processing circuit configured to decode the address frame to determine whether one of the plurality of device addresses corresponds to the target device address, wherein the processing circuit is configured to decode the address frame to determine the dedicated device configuration corresponding to one dedicated device configuration of the plurality of dedicated device configurations indicated by the address frame, and wherein, based on one of the plurality of device addresses corresponding to the target device address, the processing circuit is configured to configure the I²C device according to the dedicated device configuration determined from the address frame.

Aspect 20: A method configuring an inter-integrated circuit (I²C) device, the method comprising: receiving a serial data line (SDA) signal from a master device, wherein the SDA signal comprises an address frame that identifies a target device address of a target device for communication with the master device and a dedicated device configuration of the target device; decoding the address frame to determine whether one of a plurality of device addresses of the I²C device corresponds to the target device address; decoding the address frame to determine which one of a plurality of device addresses of the I²C device corresponds to the dedicated device configuration indicated by the address frame; and based on one of the plurality of device addresses corresponding to the target device address, configuring the I²C device according to the dedicated device configuration identified from the address frame.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations may be made in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An inter-integrated circuit (I²C) system, comprising:
a first device, that is a controller, comprising:
a first processing circuit; and
a first I²C communication interface configured to generate a first serial data line (SDA) signal based on an instruction received from the first processing circuit, wherein the first SDA signal comprises a first address frame that identifies a first target device address of a first target device for communication with the first device and a first dedicated device configuration of the first target device; and
a second device, that is a sensor, configured with a plurality of device addresses and a plurality of dedicated device configurations, wherein each device address of the plurality of device addresses is associated with one dedicated device configuration of the plurality of dedicated device configurations, wherein the second device comprises:
a sensor element configured to generate a sensor signal based on a measurable property;
a second I²C communication interface configured to receive the first SDA signal; and
a second processing circuit configured to decode the first address frame to determine whether the second device corresponds to the first target device address,
wherein, based on the second device corresponding to the first target device address, the second processing circuit is configured to decode the first address frame to identify the first dedicated device configuration corresponding to one dedicated device configuration of the plurality of dedicated device configurations indicated by the first address frame, and
wherein the second processing circuit is configured to configure the second device according to the first dedicated device configuration identified based on the first address frame,
wherein the plurality of dedicated device configurations include a sensor trigger-on configuration and a sensor trigger-off configuration,
wherein, based on the first dedicated device configuration determined from the first address frame being the sensor trigger-on configuration, the second processing circuit is configured to start a measurement frame, during which the sensor signal is sampled by a sampling circuit of the second device, and
wherein, based on the first address frame being received during the measurement frame and based on the first dedicated device configuration determined from the first address frame being the sensor trigger-off configuration, the second processing circuit is configured to generate sensor data at an end of the measurement frame and transmit the sensor data to the first device via a second SDA signal.

2. The I²C system of claim 1, wherein the second device further comprises:
a memory configured to store a look-up table that links each device address of the plurality of device addresses to one dedicated device configuration of the plurality of dedicated device configurations.

3. The I²C system of claim 2, wherein each device address of the plurality of device addresses is linked to a different dedicated device configuration of the plurality of dedicated device configurations.

4. The I²C system of claim 1, wherein the second device further comprises:
a memory configured to store the plurality of device addresses of the second device,
wherein the second processing circuit is configured to refer to the plurality of device addresses stored in the memory and determine whether the second device is the first target device based on whether the first target device address corresponds to one of the device addresses of the plurality of device addresses stored in the memory, and
wherein, based on the first address frame corresponding to one of the device addresses of the plurality of device addresses stored in the memory, the second processing circuit is configured to refer to a mapping that associates each device address of the plurality of device addresses stored in the memory with one dedicated device configuration of the plurality of dedicated device configurations for identifying the first dedicated device configuration.

5. The I²C system of claim 1, wherein the first address frame is a seven-bit address frame comprising seven bits.

6. The I²C system of claim 5, wherein the second processing circuit is configured to decode the seven bits to determine the first target device address, wherein, based on the second device corresponding to the first target device address, the second processing circuit is configured to decode the seven bits to identify the first dedicated device configuration.

7. The I²C system of claim 5, wherein the first SDA signal includes a command bit that follows the first address frame, wherein the command bit is a read command bit or a write command bit.

8. The I²C system of claim 1, wherein the first address frame comprises a first plurality of bits and a second plurality of bits,
wherein the first plurality of bits are address bits that identify the first target device address, and wherein the second plurality of bits are configuration bits corresponding to the first dedicated device configuration of the first target device.

9. The I²C system of claim 8, wherein the second processing circuit is configured to decode the first plurality of bits to determine the first target device address, wherein, based on the second device being the first target device, the second processing circuit is configured to decode the second plurality of bits to identify the first dedicated device configuration.

10. The I²C system of claim 1, wherein the second device includes an analog-to-digital converter (ADC) configured to sample the sensor signal to generate the sensor data, and wherein the second processing circuit is configured to enable the ADC to start the measurement of the sensor signal to generate the sensor data and the second processing circuit is configured to disable the ADC to stop the measurement of the sensor signal.

11. The I²C system of claim 1, wherein the first device is a controller, wherein the second device is a sensor comprising a sensor element configured to generate a sensor signal based on a measurable property, wherein the plurality of dedicated device configurations include a sensor trigger-on configuration and a sensor trigger-off configuration, wherein, based on the first dedicated device configuration determined from the first address frame being the sensor trigger-on configuration, the second processing circuit is configured to start a measurement frame, during which the sensor signal is sampled by a sampling circuit of the second device, and wherein, based on the first address frame being received during the measurement frame and based on the first dedicated device configuration determined from the first address frame being the sensor trigger-off configuration, the second processing circuit is configured to generate sensor data at an end of the measurement frame and transmit the sensor data to the first device via a second SDA signal.

12. The I²C system of claim 1, wherein the first SDA signal comprises a second address frame that identifies a second target device address of a second target device for communication with the first device and a second dedicated device configuration of the second target device, wherein the second processing circuit is configured to decode the second address frame to determine whether the second device corresponds to the second target device address, wherein, based on the second device corresponding to the second target device address, the second processing circuit is configured to decode the second address frame to identify the second dedicated device configuration corresponding to one dedicated device configuration of the plurality of dedicated device configurations indicated by the second address frame, and wherein the second processing circuit is configured to configure the second device according to the second dedicated device configuration identified based on the second address frame.

13. The I²C system of claim 12, wherein the first device is a controller, wherein the second device is a sensor comprising a sensor element configured to generate a sensor signal based on a measurable property, wherein the plurality of dedicated device configurations include a sensor trigger-on configuration and a sensor trigger-off configuration, wherein the first dedicated device configuration corresponds to the sensor trigger-on configuration, wherein the second dedicated device configuration corresponds to the sensor trigger-off configuration, wherein, based on identifying the first dedicated device configuration from the first address frame, the second processing circuit is configured to start a measurement frame, during which the sensor signal is sampled by a sampling circuit of the second device for generating sensor data, and wherein, based on identifying the second dedicated device configuration from the second address frame, the second processing circuit is configured to stop the sampling circuit from sampling the sensor signal and transmit the sensor data to the first device via a second SDA signal.

14. The I²C system of claim 13, wherein, if the second address frame is received by the second I²C communication interface during the measurement frame, the second processing circuit is configured to stop the sampling circuit from sampling the sensor signal at a completion time of the measurement frame, generate the sensor data based on the measurement frame being completed, and transmit the sensor data to the first device via the second SDA signal.

15. The I²C system of claim 14, wherein the first SDA signal includes a stop signal that triggers the start of the measurement frame.

16. An inter-integrated circuit (I²C) device configured with a plurality of device addresses and a plurality of dedicated device configurations, comprising:

at least one memory configured to store the plurality of device addresses and the plurality of dedicated device configurations, wherein each device address of the plurality of device addresses is associated with one dedicated device configuration of the plurality of dedicated device configurations;

an I²C communication interface configured to receive a serial data line (SDA) signal from a master device, wherein the SDA signal comprises an address frame that identifies a target device address of a target device for communication with the master device and a dedicated device configuration of the target device;

a sensor element configured to generate a sensor signal based on a measurable property; and a processing circuit configured to decode the address frame to determine whether one of the plurality of device addresses corresponds to the target device address, wherein the processing circuit is configured to decode the address frame to determine the dedicated device configuration corresponding to one dedicated device configuration of the plurality of dedicated device configurations indicated by the address frame, wherein, based on one of the plurality of device addresses corresponding to the target device address, the processing circuit is configured to configure the I²C device according to the dedicated device configuration determined from the address frame, wherein the plurality of dedicated device configurations include a sensor trigger-on configuration and a sensor trigger-off configuration, wherein, based on the dedicated device configuration determined from the address frame being the sensor trigger-on configuration, the processing circuit is configured to start a measurement frame, during which the sensor signal is sampled by a sampling circuit, and wherein, based on the address frame being received during the measurement frame and based on the dedicated device configuration determined from the address frame being the sensor trigger-off configuration, the processing circuit is configured to generate sensor data at an end of the measurement frame and transmit the sensor data to a controller via another SDA signal.

17. A method configuring an inter-integrated circuit (I²C) device, the method comprising:

receiving a serial data line (SDA) signal from a master device, wherein the SDA signal comprises an address frame that identifies a target device address of a target device for communication with the master device and a dedicated device configuration of the target device;

generating, based on a measurable property, a sensor signal;

decoding the address frame to determine whether one of a plurality of device addresses of the I²C device corresponds to the target device address;

decoding the address frame to determine which one of a plurality of device addresses of the I²C device corresponds to the dedicated device configuration indicated by the address frame;

based on one of the plurality of device addresses corresponding to the target device address, configuring the I²C device according to the dedicated device configuration identified from the address frame, wherein the dedicated device configuration includes a sensor trigger-on configuration and a sensor trigger-off configuration;

starting, based on the dedicated device configuration determined from the address frame being the sensor trigger-on configuration, start a measurement frame, during which the sensor signal is sampled by a sampling circuit; and generating, based on the address frame being received during the measurement frame and based on the dedicated device configuration determined from the address frame being the sensor trigger-off configuration, sensor data at an end of the measurement frame and transmit the sensor data to a controller via another SDA signal.

18. The I²C system of claim 1, wherein the second processing circuit is configured to configure the second device according to the first dedicated device configuration identified based on processing only the first address frame from the SDA signals.

19. The I²C device of claim 16, further comprising:

a memory configured to store a look-up table that links each device address of the plurality of device addresses to one dedicated device configuration of the plurality of dedicated device configurations.

20. The method of claim 17, further comprising:

storing a look-up table that links each device address of the plurality of device addresses to one dedicated device configuration of the plurality of dedicated device configurations.

* * * * *